(12) United States Patent
Shimazawa et al.

(10) Patent No.: US 8,787,661 B2
(45) Date of Patent: Jul. 22, 2014

(54) OBJECT PROCESSING DEVICE AND OBJECT SELECTION METHOD

(75) Inventors: Ko Shimazawa, Tokorozawa (JP); Jun Tanaka, Yokohama (JP)

(73) Assignee: Wingarcist Inc., Tokyo (JP)

( * ) Notice: Subject to any disclaimer, the term of this patent is extended or adjusted under 35 U.S.C. 154(b) by 166 days.

(21) Appl. No.: 13/505,549

(22) PCT Filed: Dec. 20, 2010

(86) PCT No.: PCT/JP2010/072890
§ 371 (c)(1),
(2), (4) Date: May 2, 2012

(87) PCT Pub. No.: WO2011/083676
PCT Pub. Date: Jul. 14, 2011

(65) Prior Publication Data
US 2012/0213433 A1    Aug. 23, 2012

(30) Foreign Application Priority Data

Jan. 7, 2010 (JP) ................................ 2010-002088

(51) Int. Cl.
*G06K 9/34* (2006.01)
*G06F 3/0481* (2013.01)

(52) U.S. Cl.
CPC .......... *G06F 3/04815* (2013.01); *G06F 3/0481* (2013.01); *G06F 2203/04802* (2013.01)
USPC ........... 382/164; 382/162; 382/165; 382/289; 382/295; 707/696; 715/781

(58) Field of Classification Search
CPC ........................... G06F 17/212; G06F 17/5081
See application file for complete search history.

(56) References Cited

U.S. PATENT DOCUMENTS

| | | | |
|---|---|---|---|
| 6,691,126 B1 * | 2/2004 | Syeda-Mahmood | 707/696 |
| 7,215,828 B2 * | 5/2007 | Luo | 382/289 |
| 7,263,220 B2 * | 8/2007 | Crandall et al. | 382/165 |
| 2006/0198555 A1 * | 9/2006 | Hosotsubo | 382/162 |
| 2007/0050729 A1 * | 3/2007 | Kawamura et al. | 715/781 |
| 2008/0089612 A1 * | 4/2008 | Isomura | 382/295 |

FOREIGN PATENT DOCUMENTS

| | | |
|---|---|---|
| JP | 62-140172 A | 6/1987 |
| JP | 09-223241 A | 8/1997 |
| JP | 11-265246 A | 9/1999 |
| WO | WO-2007/126096 A1 | 11/2007 |

* cited by examiner

*Primary Examiner* — Tsung-Yin Tsai
(74) *Attorney, Agent, or Firm* — Novak Druce Connolly Bove + Quigg LLP

(57) ABSTRACT

A portion within an image in which a plurality of objects (21 and 22) overlap is partitioned into a plurality of small regions (31*a* and 32*a*), each of the units of identification information for the plurality of objects (21 and 22) is assigned to a dot corresponding to the plurality of small regions (31*a* and 32*a*), and thereby, identification-use layout information is generated, whereby even if a plurality of objects overlap upon a layout of a display image, upon the layout of the identification-use layout information that has been generated for identifying the plurality of objects, the identification information corresponding to each object does not overlap. As a result, it is possible to identify each object by the identification information acquired from the position of the cursor.

4 Claims, 6 Drawing Sheets

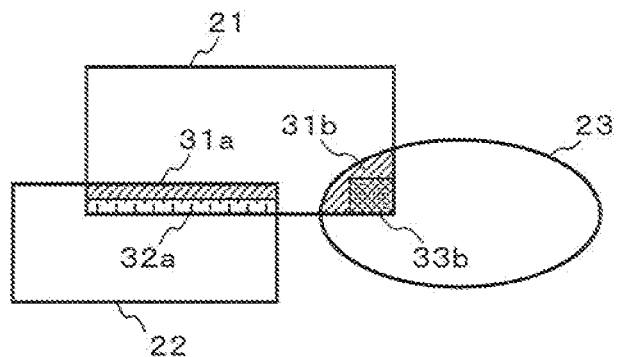
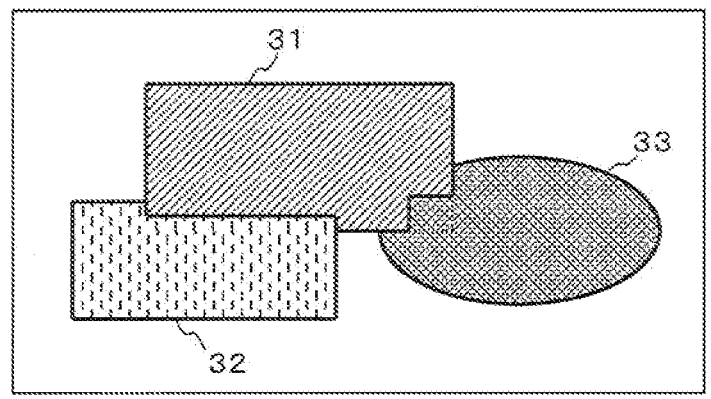

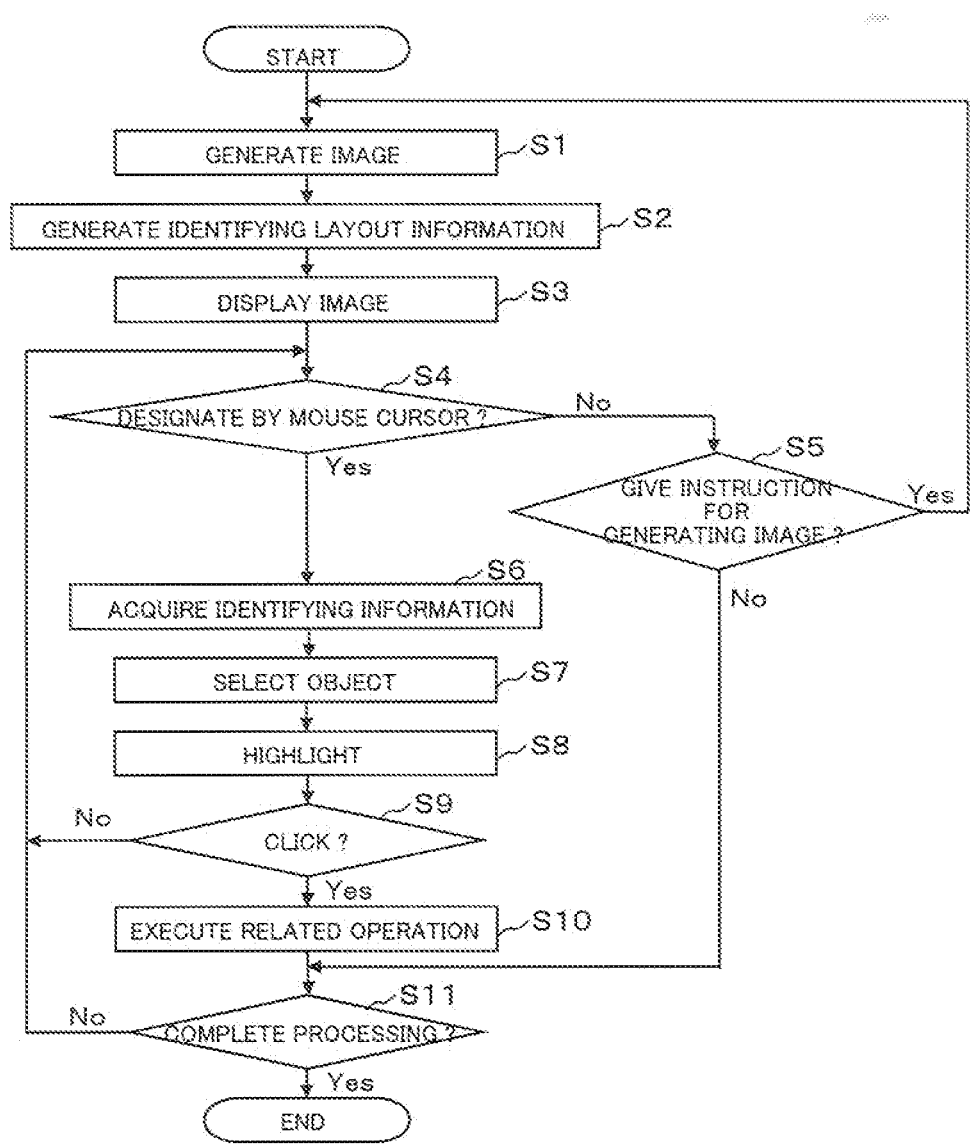

Fig. 10
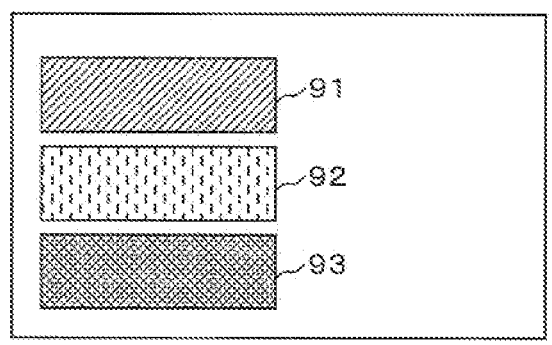
(a)
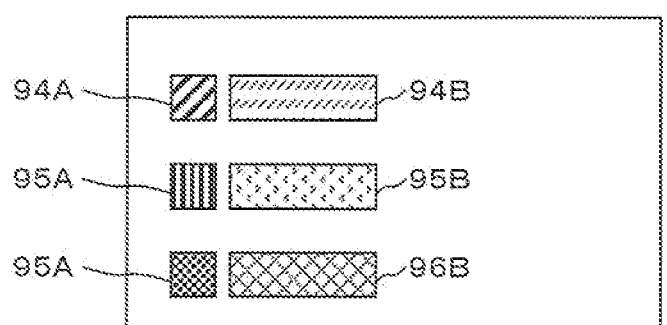
(b)

OBJECT PROCESSING DEVICE AND OBJECT SELECTION METHOD

CROSS REFERENCE TO RELATED APPLICATIONS

This application is a National Phase filing under 35 U.S.C. §371 of PCT/JP2010/072890 filed on Dec. 20, 2010; and this application claims priority to Application No. 2010-002088 filed in Japan on Jan. 1, 2010 under 35 U.S.C. §119; the entire contents of all are hereby incorporated by reference.

TECHNICAL FIELD

The present invention relates to an object processing device and an object selection method, and more particularly to an object processing device and an object selection method for supporting to select a desirable one of the objects displayed on a screen by a pointing device.

BACKGROUND ART

Conventionally, there is widely offered the technique capable of treating graphics, marks, characters, illustrations and the like which are displayed on a screen of a display device as independent objects respectively and designating and selecting a desirable one of the objects by a pointing device such as a mouse. By applying the technique to select the desirable object, it is possible to cause a computer to execute a predetermined processing related to the selected object.

Moreover, there is also offered the technique for enlarging or reducing an image including the object. As shown in FIG. 1, in the case in which an image 104 including a plurality of objects 101 to 103 is reduced, the individual objects 101 to 103 included in the image 101 are reduced, and at the same time, an interval between the objects is also reduced. In some cases in which the interval between the objects is smaller than sizes of the objects 101 to 103, the reduced objects 101 to 103 overlap with each other when a reduction ratio is increased.

For example, in the case in which two objects overlap with each other, upper and lower portions which overlap with each other are generated according to a predetermined rule. In other words, a part of the object on a lower side is hidden under a part of the objects on an upper side. In this case, if a cursor of a mouse is placed over a portion in which two objects overlap with each other, the object on the upper side is selected. In order to select the object on the lower side, accordingly, it is necessary to place the cursor over a portion which is provided on the object at the lower side and does not overlap with the object on the upper side.

In some cases, however, the objects included in the image perfectly overlap with each other and the smaller objects are perfectly hidden under the greater objects when the image is reduced. In some cases, alternatively, at least three objects overlap with each other so that one of the objects is perfectly hidden under the other two objects or more. In such a state, there is caused a problem in that the object hidden under the other objects cannot be selected by means of a mouse.

There is proposed the technique in which a desirable object can be selected also in the case in which a certain object is perfectly hidden under the other objects (for example, see Patent Document 1). In the technique described in the Patent Document 1, a mouse cursor is placed over a portion in which two objects overlap with each other, and the object on the upper side is assumed to be selected when a left button of a mouse is pushed down and the object on the lower side is assumed to be selected when a right button of the mouse is pushed down.

Patent Document 1: Japanese Laid-Open Patent Publication No. 9-223241
Patent Document 1: Japanese Laid-Open Patent Publication No. 11-299106
Patent Document 2: Japanese Laid-Open Patent Publication No. 2000-308370

DISCLOSURE OF THE INVENTION

Referring to the technique described in the Patent Document 1, however, it is necessary to push down the left or right button of the mouse in order to select the desirable object. In other words, there is a problem in that the desirable object cannot be selected even if a mouse cursor is simply placed over a position of the object. For this reason, it, is impossible to highlight the desirable object by placing the mouse cursor over the object and to decide a selecting state through a click of the left button (or executing a predetermined processing), for example.

As a result of the reduction in the image, moreover, the presence of the object on the lower side cannot be known even if the display of the screen is seen in the case in which the certain object is perfectly hidden under the other objects. In most cases, accordingly, the object on the upper side is selected through the click of the left button of the mouse. In order to select the object on the lower side, it is necessary to push down the right button of the mouse in order to make sure even if the presence is not known. In many cases, therefore, the operation is useless. Consequently, there is also a problem in that the operation for selecting a desirable object is complicated.

The present invention has been made to solve the problems and has an object to enable a selection of a desirable object by a very simple operation also in the case in which a certain object is perfectly hidden under the other objects.

In order to attain the object, in the present invention, identifying layout information constituted by giving identifying information of objects to dots related to the objects respectively over the same two-dimensional layout as an image including the objects is generated in relation to the image. Referring to an object having no overlap in an image, the identifying information of the object is given to the dots corresponding to the object respectively when the identifying layout information is to be generated. On the other hand, referring to the objects having the overlap, the identifying information of the objects is given to the dots corresponding to the portion having no overlap respectively and the portion having the overlap is divided into a plurality of small regions to give the identifying information of the objects to the dots corresponding to the small regions, respectively. The identifying information corresponding to the dot designated over the image displayed on the display device is acquired from the identifying layout information to select the object corresponding to the identifying information thus acquired.

According to the present invention having the structure described above, it is possible to identify the object provided in the position in which the cursor is placed over the image by using the identifying layout information generated separately from the image to be displayed on the display device. In the case in which the objects included in the image have the overlap, the identifying layout information is generated by dividing the overlapping portion into the small regions and giving the identifying information of the objects to the small regions, respectively. Even if the objects overlap with each other over the layout of the image displayed on the display device, therefore, the identifying information corresponding to the respective objects do not overlap with each other over the layout of the identifying layout information generated to identify the objects. As a result, each of the objects can be identified based on the identifying information acquired from the position of the cursor. Also in the case in which a certain object is perfectly hidden under the other objects in respect of a display, accordingly, it is possible to select a desirable object by a very simple operation.

BRIEF DESCRIPTION OF THE DRAWINGS

FIG. 5 is a diagram showing an example in which a portion in which the objects overlap each other is divided into small regions to give identifying information of each of the objects.

FIG. 6 is a diagram showing identifying layout information generated by the reduced image illustrated in FIG. 3(b).

FIG. 7 is a flow chart showing an example of an operation of the image processing device according to the present embodiment.

FIG. 10 is a diagram showing an example of first identifying layout information and second identifying layout information which are generated by an identifying information generating portion according to the present embodiment.

BEST MODE FOR CARRYING OUT THE INVENTION

Figure 1:
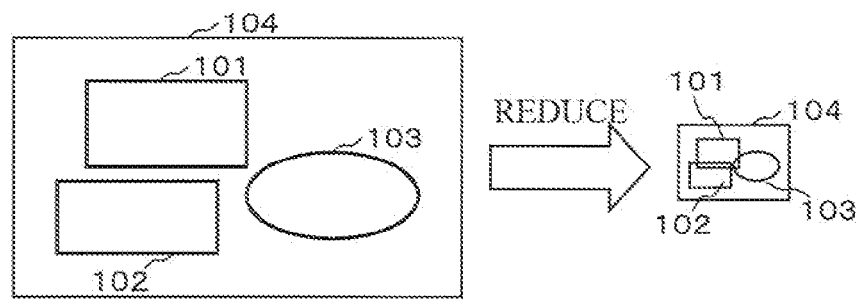
FIG. 1 is a diagram showing an example of the case in which an image including a plurality, of objects is reduced.
Figure 2:
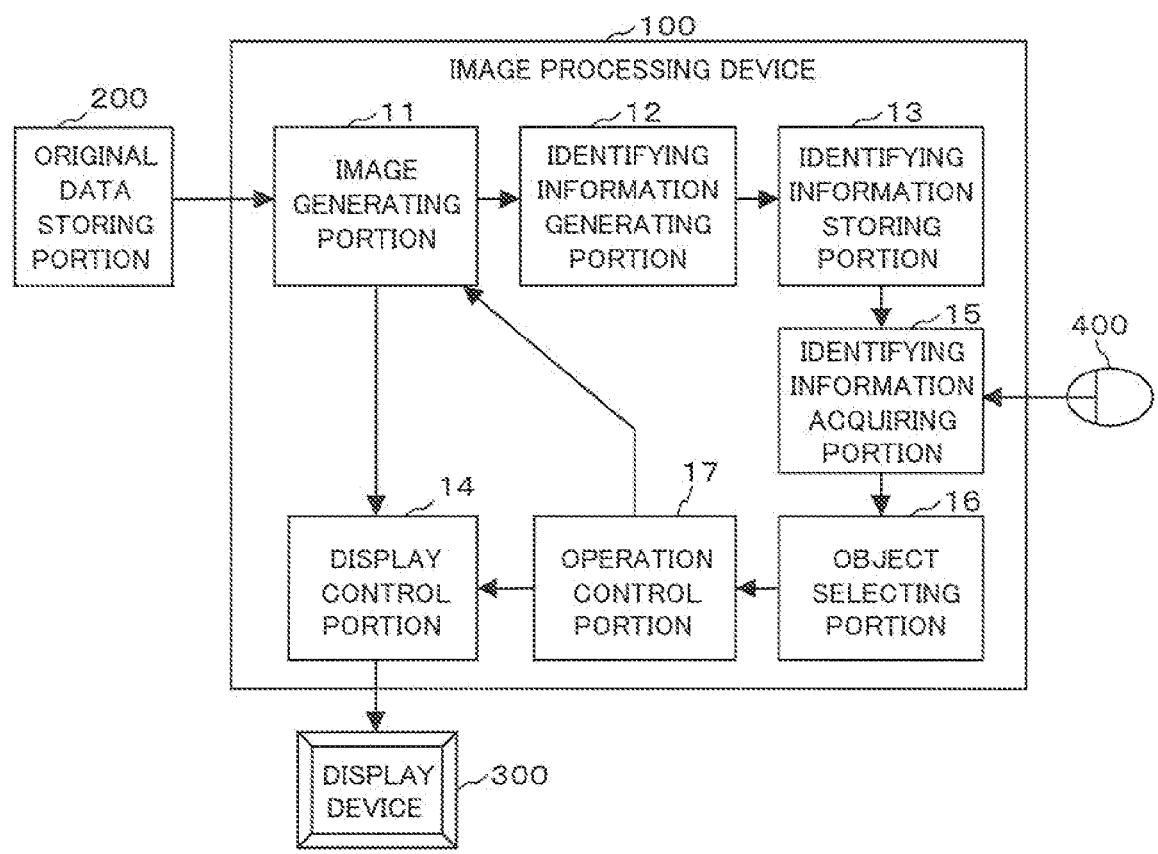
FIG. 2 is a block diagram showing an example of a functional structure of an image processing device including an object processing device according to the present embodiment.

An embodiment according to the present invention will be described below with reference to the drawings. FIG. 2 is a block diagram showing an example of a functional structure of an image processing device 100 including an object processing device according to the present embodiment. The image processing device 100 according to the present embodiment is provided in a personal computer, for example. As shown in FIG. 2, moreover, the image processing device 100 according to the present embodiment includes, as a functional structure thereof, an image generating portion 11, an identifying information generating portion 12, an identifying information storing portion 13, a display control portion 14, an identifying information acquiring portion 15, an object selecting portion 16, and an operation control portion 17.

The respective functional blocks 11 to 17 can also be implemented by any of a hardware structure, a DSP (Digital Signal Processor) and software. For example, in the case in which they are implemented in the software, the image processing device 100 according to the present embodiment is actually constituted to include a CPU, an MPU, an RAM, an ROM or the like in a computer and can be implemented by an operation of a program stored in the RAM or the ROM.

The image generating portion 11 generates an image including a plurality of objects by using original data stored in an original data storing portion 200. For example, the original data includes the objects and layout information representing an arrangement thereof, and the image generating portion 11 generates an image in a predetermined size including the objects (which will be hereinafter referred to as an original image) by using the original data. Moreover, the image generating portion 11 reduces the original image to generate a reduced image or enlarges the original image to generate an enlarged image.

Figure 3:
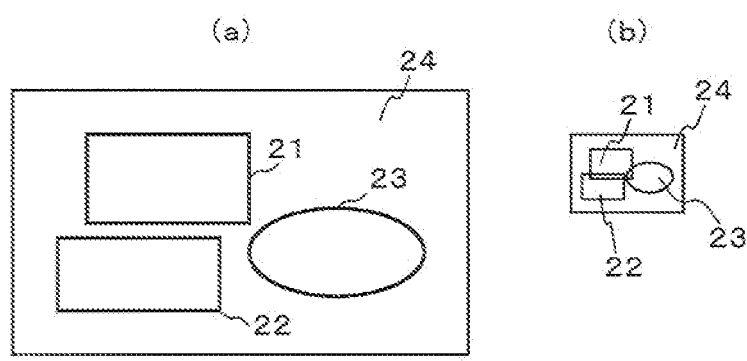
FIG. 3 is a diagram showing an example of an original image and the reduced image which are generated by an image generating portion according to the present embodiment.

FIG. 3 is a diagram showing an example of the original image and the reduced image which are generated by the image generating portion 11. FIG. 3(a) shows the original image and FIG. 3(b) shows the reduced image. In the example of FIG. 3, there is shown an image in which three objects 21, 22 and 23 are present on a background 24. In the case in which the original image including the objects 21 to 23 is reduced, the individual objects 21 to 23 included in the original image are reduced together with the background 24, and at the same time, an interval between the objects 21 to 23 is also reduced. As a result, the reduced objects 21 to 23 cause an overlap in the reduced image shown in FIG. 3(b).

As will be described below, by designating and selecting the desirable objects 21 to 23 in the image generated by the image generating portion 11 by means of the pointing device such as the mouse 400, it is possible to cause a computer (for example, a personal computer including the image processing device 100) to execute a predetermined processing related to the selected object.

The identifying information generating portion 12 generates identifying information capable of identifying the objects on the image respectively based on the image (the original image, the reduced image or the enlarged image) generated by the image generating portion 11, and generates identifying layout information constituted by giving the identifying information to the dots related to the objects respectively over the same two-dimensional layout (bit map layout) as the image. In the present embodiment, color information is used as the identifying information of each of the dots which is generated by the identifying information generating portion 12. The identifying information generating portion 12 stores the identifying layout information thus generated in the identifying information storing portion 13.

The identifying information generating portion 12 decides whether or not the objects overlap with each other when generating the identifying layout information. Referring to the object having no overlap, identifying information of the object is given to each of the dots of the identifying layout information corresponding to the object.

On the other hand, referring to the objects having the overlap, the identifying information of the objects are given to the dots of the identifying layout information corresponding to the portion having no overlap, respectively. Moreover, the portion having the overlap is divided into a plurality of small regions, and the identifying information of the objects are given to the dots of the identifying layout information corresponding to the small regions, respectively.

For example, in the case in which the three objects 21 to 23 have no overlap as shown in FIG. 3(a), the identifying information of the objects 21 to 23 are given to the dots of the identifying layout information corresponding to the objects 21 to 23, respectively. In other words, first identifying information is given to each of the dots of the identifying layout information corresponding to the first object 21, second identifying information is given to each of the dots of the identifying layout information corresponding to the second object 22, and third identifying information is given to each of the dots of the identifying layout information corresponding to the third object 23.

Figure 4:
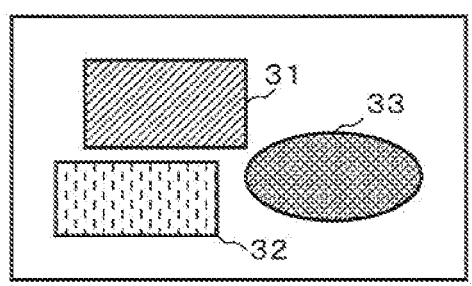
FIG. 4 is a diagram showing identifying layout information generated by the original image illustrated in FIG. 3(a).

FIG. 4 is a diagram showing identifying layout information generated from the original image illustrated in FIG. 3(a). As shown in FIG. 4, in the case in which the objects 21 to 23 have no overlap, identifying layout information is generated by giving first to third identifying information 31 to 33 to the dots in exactly the same regions as the objects 21 to 23 respectively over the same two-dimensional layout as the original image in FIG. 3(a). The identifying information is not given to a corresponding portion to the background 24 in the identifying layout information.

On the other hand, in the case in which the three objects 21 to 23 have an overlap as shown in FIG. 3(b), the first to third identifying information 31 to 33 corresponding to the three objects 21 to 23 are given to the dots of the identifying layout information corresponding to a non-overlapping portion, respectively. Referring to the overlapping portion, moreover, a region on the identifying layout information is divided into a plurality of small regions, and identifying information of the overlapping objects are given to the dots of the identifying layout information corresponding to the small regions, respectively.

FIG. 5 is a diagram showing an example in which the portion in which the objects overlap with each other is divided into the small regions to give the identifying information of the respective objects. As shown in. FIG. 5, the first object 21 and the second object 22 partially overlap with each other. In this case, the identifying information generating portion 12 divides a region on the identifying layout information in the overlapping portion into two small regions 31a and 32a, gives the first identifying information 31 to the small region 31a at a close side to the first object 21, and gives the second identifying information 32 to the other small region 32a at a close side to the second object 22. Herein, the two small regions 31a and 32a are divided in such a manner that areas are equal to each other. Both the first object 21 and the second object 22 take rectangular shapes. Therefore, the two small regions 31a and 32a alto take rectangular shapes.

Moreover, the first object 21 partially overlaps with the third object 23. In this case, the identifying information generating portion 12 divides a region on the identifying layout information in the overlapping portion into two small regions 31b and 33b, gives the first identifying information 31 to the small region 31b at a close side to the first object 21, and gives the third identifying information 33 to the small region 33b at a close side to the third object 23. The two small regions 31b and 33b are also divided in such a manner that areas are equal to each other.

While the first object 21 takes a rectangular shape, the third object 23 takes an elliptical shape. Therefore, both of the two small regions 31b and 33b do not take the rectangular shape. Although the other small region 33b at a close side to the third object 23 is set to take the rectangular shape and the residual overlapping region is set to be the small region 31b in the example of FIG. 5, the shapes of the small regions 31b and 33b are not restricted thereto.

FIG. 6 is a diagram showing identifying layout information generated from the reduced image illustrated in FIG. 3(b). Although the identifying layout information generated from the reduced image is generated in an equal size over the same two-dimensional layout as the reduced image, FIG. 6 shows the identifying layout information in an enlarged size for convenience of explanation.

As shown in FIG. 6, in the case in which the objects 21 to 23 have the overlap, the regions of the first to third identifying information 31 to 33 in the identifying layout information take different shapes from the shapes of the first to third objects 21 to 23. In other words, the region of the first identifying information 31 takes a shape in which the small regions 32a and 33b are removed from the region of the first object 21. The region of the second identifying information 32 takes a shape in which the small region 31a is removed from the region of the second object 22. Moreover, the region of the third identifying information 33 takes a shape in which the small region 31b is removed from the region of the third object 23.

The display control portion 14 controls to cause a display device 300 to display an image generated by the image generating portion 11. The identifying information acquiring portion 15 acquires identifying information (color information) corresponding to a dot designated by the cursor of the mouse 400 over the image displayed on the display device 300 by the display control portion 14 from the identifying layout information stored in the identifying information storing portion 13. The identifying layout information has the same configuration as that of image data (bit map data) to which the color information is given to each dot of the two-dimensional layout. Therefore, the color information can be acquired by using the get Pixcel function in the BitmapData class.

The object selecting portion 16 selects an object corresponding to the identifying information (color information) acquired by the identifying information acquiring portion 15. In other words, the object selecting portion 16 selects, as an object, a dot string indicated by the identifying information acquired from the identifying layout information by the identifying information acquiring portion 15. For example, in the case in which a dot in the region of the first identifying information 31 shown in FIG. 6 is designated by the mouse cursor, the identifying information acquiring portion 15 acquires the first identifying information 31 from the identifying layout information, and the object selecting portion 16 correspondingly selects the first object 21.

When the object is selected by the object selecting portion 16, the operation control portion 17 controls to carry out a predetermined operation related to the object thus selected. For example, the operation control portion 17 controls the image generating portion 11 and the display control portion 14 to highlight the object selected by the object selecting portion 16. More specifically, the image generating portion 11 receives the control of the operating control portion 17, thereby redrawing an image in such a manner that the object selected by the object selecting portion 16 appears over a frontmost surface in a specific highlight color. Then, the display control portion 14 causes the display device 300 to display the image which is redrawn by the image generating portion 11.

When the object selected by the object selecting portion 16 is clicked by the mouse 400, moreover, the operation control portion 17 controls to carry out a predetermined operation related to the object. For example, an application related to the object is started or the display control portion 14 is controlled to cause the display device 300 to display information related to the object. In order to carry out the operation, for example, related information to the object and the application in the original data stored in the original data storing portion 200 or information about the object is stored. Then, the operation control portion 17 controls to execute a predetermined operation by referring to these information.

Next, description will be given to the operation of the image processing device 100 according to the present embodiment which has the structure described above. FIG. 7 is a flow chart showing an example of the operation of the image processing device 100 according to the present embodiment. The flow chart shown in FIG. 7 is started when the image processing device 100 is started to give an instruction for displaying an image.

In FIG. 7, first of all, the image generating portion 11 generates an image including a plurality of objects by using the original data stored in the original data storing portion 200 (Step S1). The original image is first generated. Next, the identifying information generating portion 12 generates the identifying layout information based on the image generated by the image generating portion 11 and stores the identifying layout information in the identifying information storing portion 13 (Step S2). Subsequently, the display control portion 14 causes the display device 300 to display the image generated by the image generating portion 11 (Step S3).

In a state in which the image is displayed on the display device 300, the identifying information acquiring portion 15 decides whether a position is designated by the mouse cursor over the image or not (Step S4). If the identifying information acquiring portion 15 decides that the position is not designated by the mouse cursor over the image, the image generating portion 11 decides whether an instruction for generating an image such as a reduction of the image, an enlargement of the image or the like is given by a user or not (Step S5).

The instruction for reducing or enlarging the image can be given by operating the mouse 400 to drag a boundary portion between image display regions and to optionally reduce or enlarge the image display regions. Alternatively, it is also possible to give the instruction for reducing or enlarging the image by operating the mouse 400 to select a desirable reduction ratio or enlargement ratio from a menu.

If it is decided that the instruction for generating an image is not given, the processing jumps to Step S11. On the other hand, if it is decided that the instruction for generating an image is given, the processing returns to the Step S1 in which the image generating portion 11 generates a reduced image or an enlarged image in a size designated by the operation of the mouse 400. Then, the identifying information generating portion 12 regenerates the identifying layout information based on the image generated by the image generating portion 11 and stores the identifying layout information in the identifying information storing portion 13 (Step S2). Subsequently, the display control portion 14 causes the display device 300 to display the image which is regenerated by the image generating portion 11 (Step S3).

If the identifying information acquiring portion 15 decides that the position is designated through the mouse cursor over the image (the original image, the reduced image or the enlarged image) generated by the image generating portion 11 in a state in which the image is displayed on the display device 300 (Yes in Step S4), the identifying information acquiring portion 15 acquires identifying information corresponding to a dot designated by the mouse cursor from the identifying layout information, of the identifying information storing portion 13 (Step S6).

Next, the object selecting portion 16 selects an object corresponding to the identifying information acquired by the identifying information acquiring portion 15 (Step S7). Then, the operation control portion 17 controls the image generating portion 11 and the display control portion 14 to highlight the object selected by the object selecting portion 16 (Step S8). Then, the operation control portion 17 decides whether the selected object is clicked by the mouse 400 or not (Step S9).

If the selected object is not clicked, the processing returns to the Step S4. On the other hand, if the selected object is clicked, the operation control portion 17 controls to carry out a predetermined operation related to the clicked object (the start of an application, the display of related information or the like) (Step S10). Finally, the image processing device 100 decides whether an instruction for ending the operation is given by a user or not (Step S11). If the instruction for ending the operation of the image processing device 100 is not given, the processing returns to the Step S4. On the other hand, if the instruction for ending the operation of the image processing device 100 is given, the processing of the flow chart shown in FIG. 7 is ended.

As described above in detail, in the present embodiment, the identifying layout information for identifying the objects included in the image is generated separately from the image for a mouse decision. The identifying layout information is obtained by giving the identifying information of the objects to the dots related to the objects respectively over the same two-dimensional layout as the image. In a portion in which the objects overlap with each other, particularly, the overlapping region is divided into a plurality of small regions and identifying information of the objects is given to the dots corresponding to the small regions, respectively. Then, the identifying information corresponding to the dot designated by the mouse cursor over the image displayed on the display device 300 is acquired from the identifying layout information and the object corresponding to the identifying information thus acquired is selected.

By using the identifying layout information generated separately from the image displayed on the display device 300, thus, it is possible to identify the object provided in a position over which the cursor is placed. Image information in the position over which the cursor is placed is not acquired. Even if the whole image including the object is generated by bit map data, therefore, it is possible to identify the object included in the image.

Even if the objects overlap with each other over the layout of the image displayed on the display device 300 (see FIG. 3(*b*)), moreover, the identifying information corresponding to the respective objects do not overlap with each other over the layout of the identifying layout information generated to identify the objects (see FIG. 6). Therefore, the respective objects overlapping with each other can also be identified based on the identifying information acquired from the position of the cursor. Also in the case in which the certain object is perfectly hidden under the other object in respect of the display, accordingly, it is possible to select a desirable object including the hidden object by a very simple operation for only moving the cursor.

In the present embodiment, moreover, coordinate information is not acquired from the mouse 400 but the identifying information is acquired from the identifying layout information in order to decide the position of the mouse cursor. Referring to a method of acquiring the coordinate information from the mouse 400, it is necessary to acquire the coordinate information from the mouse 400 of the external device one by one every time the cursor is moved slightly. Consequently, a long time is required.

On the other hand, referring to the method of acquiring the identifying information from the internal identifying layout information as in the present embodiment, it is possible to instantaneously acquire the identifying information by following the movement of the mouse cursor. Therefore, it is possible to enhance a speed for deciding a mouse position. Consequently, it is possible to extremely enhance a serial performance from a display of an image to an execution highlighting of an object selected via a decision of a mouse position, or the like.

Although the description has been given to the example in which the highlighting is carried out if the object is selected by designating a position., through the mouse cursor, and a starting operation of an application or the like is performed if the object is clicked in the embodiment, a control operation of the operation control portion 17 is not restricted to the example. In other words, an optional operation can be carried out to meet the uses.

Figure 8:
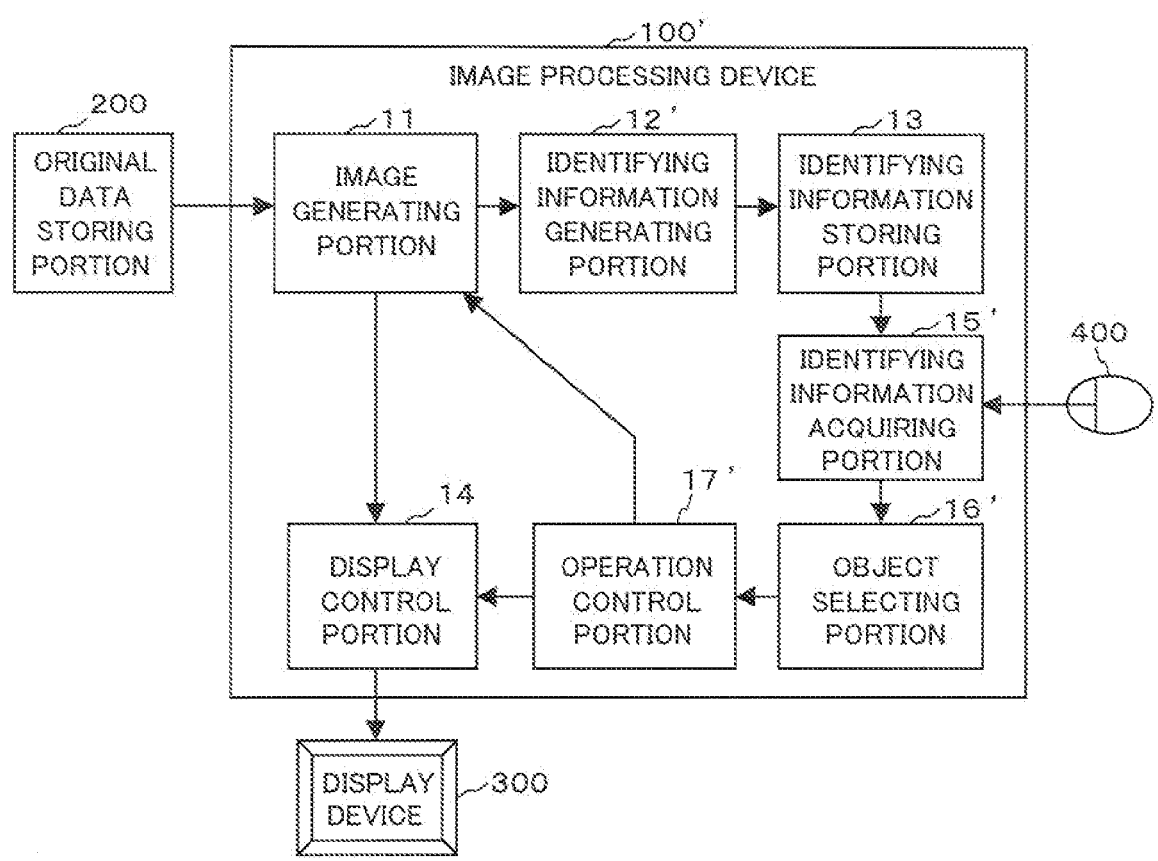
FIG. 8 is a block diagram showing an example of a functional structure of the image processing device applying the object processing device according to the present embodiment.

Next, description will be given to an application example of the object processing device according to the present embodiment. FIG. 8 is a block diagram showing an example of a functional structure of an image processing device 100' which applies the object processing device according to the present embodiment. In FIG. 8, since members having the same reference numerals as those shown in FIG. 2 have the same functions, repetitive description will be omitted.

The image processing device 100' shown in FIG. 8 includes, as functional structures thereof, an image generating portion 11, an identifying information generating portion 12', an identifying information storing portion 13, a display control portion 14, an identifying information acquiring portion 15', an object selecting portion 16' and an operation control portion 17'. These respective functional blocks can also be implemented by any of a hardware structure, a DSP and software.

The identifying information generating portion 12' generates two types of identifying layout information. The identifying layout information include first identifying layout information and second identifying layout information. The first identifying layout information serves to identify a group including a plurality of objects. Moreover, the second identifying layout information serves to identify individual objects contained in a group.

More specifically, the identifying information generating portion 12' classifies a plurality of objects included in an image generated by the image generating portion 11 into a plurality of groups. The identifying information generating portion 12' gives each of identifying information of a group to each of dots corresponding to all objects included in the group over the same two-dimensional layout as an image for each of the groups, thereby generating the first identifying layout information. Moreover, the identifying information generating portion 12' gives each of the identifying information of the objects included the group to each of the dots corresponding to the individual objects over the same two-dimensional layout as the image for each of the objects, thereby generating the second identifying layout information.

Figure 9:
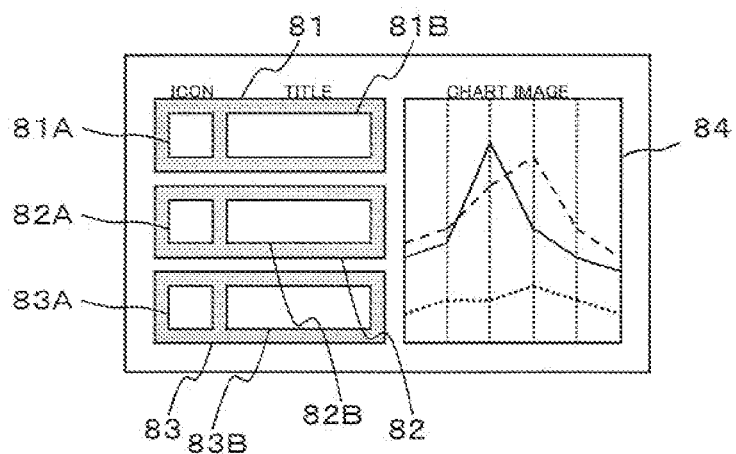
FIG. 9 is a diagram showing an example of an image generated by the image generating portion according to the present embodiment and objects and groups which are included in the image.

FIG. 9 is a diagram showing an example of an image generated by the image generating portion 11 and objects and groups included in the image. In FIG. 9, 81A, 82A and 83A denote an object of a mark representing an icon, 81B, 82B and 83B denote an object of a text representing a title, and 84 denotes a chart image such as a graph (this object is assumed to be non-selectable by the mouse cursor in the example).

In the example of FIG. 9, three graphs are displayed as the chart image 84. The objects in the image are classified into three groups corresponding to the three graphs. In other words, two objects 81A and 81B are classified into a first group 81, two objects 82A and 82B are classified into a second group 82, and two objects 83A and 83B are classified into a third group 83. Any group to which any object belongs is indicated based on original data, for example.

FIG. 10 is a diagram showing an example of the first identifying layout information and the second identifying layout information which are generated by the identifying information generating portion IV based on the image illustrated in FIG. 9. FIG. 10(*a*) shows the first identifying layout information and FIG. 10(*b*) shows the second identifying layout information.

As shown in FIG. 10(*a*), the identifying information generating portion 12' gives first identifying information 91 to each of dots in a rectangular region within a predetermined range surrounding all of the objects 81A and 81B in the first group 81 when generating the first identifying layout information. Moreover, the identifying information generating portion 12' gives second identifying information 92 to each of dots in a rectangular region within a predetermined range surrounding all of the objects 82A and 82B in the second group 82. Furthermore, the identifying information generating portion 12' gives third identifying information 93 to each of dots in a rectangular region within a predetermined range surrounding all of the objects 83A and 83B in the third group 83.

As shown in FIG. 10(*b*), moreover, the identifying information generating portion 12' gives fourth and fifth identifying information 94A and 94B to dots corresponding to the individual objects 81A and 81B included in the first group 81 respectively when generating the second identifying layout information. Moreover, the identifying information generating portion 12' gives sixth and seventh identifying information 95A and 95B to dots corresponding to the individual objects 82A and 82B included in the second group 82, respectively. Furthermore, the identifying information generating portion 12' gives eighth and ninth identifying information 96A and 96B to dots corresponding to the individual objects 83A and 83B included in the third group 83, respectively.

The identifying information generating portion 12' stores, in the identifying information storing portion 13, the first identifying layout information and the second identifying layout information which are generated as described above. Also in the application example shown in FIG. 8, color information is used as identifying information of each dot which is generated by the identifying information generating portion 12'. More specifically, the identifying information of each of the dots in the identifying layout information generated by the identifying information generating portion 12' is color information in which a similar color within a predetermined range is grouped in an identical color group, and the similar color in the identical color group is given to a single group. It is assumed that the similar color can be rarely identified by human eyes but can be identified by a computer.

In other words, the identifying information generating portion 12' gives color information about the similar color belonging to the identical color group to the dots corresponding to the objects included in a single group, respectively. In that case, the identifying information generating portion 12' gives color information about different similar colors to the dots corresponding to the objects included in the single group respectively, thereby generating the second identifying layout information. Moreover, the identifying information generating portion 12' gives a similar-color which is different from the similar color used in the second identifying layout information to the dots in a rectangular region within a predetermined range surrounding all of the objects in the group respectively, thereby generating the first identifying layout information.

For example, the identifying information generating portion 12' gives color information about similar colors which belong to the identical color group and are different from each other as fourth and fifth identifying information 94A and 94B to the dots over the second identifying layout information corresponding to the two objects 81A and 81B included in the first group 81, respectively. Moreover, the identifying information generating portion 12' gives color information about a similar color which is different from the fourth and fifth identifying information 94A, and 94B as the first identifying information 91 to the dots respectively over the first identifying layout information corresponding to the rectangular region surrounding the two objects 81A and 81B.

In addition, the identifying information generating portion 12' gives color information about similar colors which belong to an identical color group (a different group from the group set to the first group 81) and are different from each other as sixth and seventh identifying information 95A and 95B to each of the dots over the identifying layout information corresponding to each of the two objects 82A and 82B included in the second group 82, respectively. Moreover, the identifying information generating portion 12' gives color information about a similar color which is different from the sixth and seventh identifying information 95A and 95B as the second identifying information 92 to each of the dots over the first identifying layout information corresponding to the rectangular region surrounding the two objects 82A and 82B.

Furthermore, the identifying information generating portion 12' gives color information about similar colors which belong to an identical color group (a different group from the groups set to the first group 81 and the second group 82) and are different from each other as eighth and ninth identifying information 96A and 96B to each of the dots over the identifying layout information corresponding to each of the two objects 83A and 83B included in the third group 83, respectively. In addition, the identifying information generating portion 12' gives color information about a similar color which is different from the eighth and ninth identifying information 96A and 96B as the third identifying information 93 to each of the dots over the first identifying layout information corresponding to the rectangular region surrounding the two objects 83A and 83B.

The identifying information acquiring portion 15' acquires identifying information (color information) corresponding to a dot designated by the cursor of the mouse 400 over an image displayed on a display device 300 through the display control portion 14 from the identifying layout information stored in the identifying information storing portion 13. For example, the identifying information acquiring portion 15' acquires the color information from the first identifying layout information when the mouse cursor is simply placed over a desirable position, and acquires the color information from the second identifying layout information when a click is carried out in the position over which the mouse cursor is placed.

When the color information is acquired from the first identifying layout information by the identifying information acquiring portion 15', the object selecting portion 16' selects a group including an object corresponding to the color information. When the color information is acquired from the second identifying layout information by the identifying information acquiring portion 15', moreover, the object selecting portion 16' selects an object corresponding to the color information. In other words, the object selecting portion 16' selects, as a group including an object, a dot string indicated by the color information acquired from the first identifying layout information through the identifying information acquiring portion 15', and selects, as an object, a dot string indicated by the color information acquired from the second identifying layout information through the identifying information acquiring portion 15'.

When an object or a group thereof is selected by the object selecting portion 16', the operation control portion 17' controls to carry out a predetermined operation related to the selected object or group. For example, in the case in which a desirable group including objects is selected by the object selecting portion 16', the operation control portion 17' controls the image generating portion 11 and the display control portion 14 in order to highlight the selected group.

In the case in which a desirable object is selected (clicked) by the object selecting portion 16', moreover, the operation control portion 17' starts an application related to the selected object or controls the display control portion 14 to display information related to the object on the display device 300.

Also in the application example described with reference to FIGS. 8 to 10, in the case in which a plurality of objects overlaps with each other or the case in which a plurality of groups overlaps with each other due to a reduction in the image shown in FIG. 9, for instance, the overlapping region is divided into a plurality of small regions and identifying information is given to dots corresponding to the small regions, respectively. Then, identifying information corresponding to the dot designated through the mouse cursor over the image displayed on the display device 300 is acquired from the first identifying layout information or the second identifying layout information, and an object or a group corresponding to the identifying information thus acquired is selected.

Even if objects or groups of the objects, overlap with each other over the layout of the image displayed on the display device 300, consequently, the identifying information corresponding to each of the objects or each of the groups do not overlap with each other over the layout of the identifying layout information generated to identify the objects or the groups. Therefore, it is possible to identify each of the objects or each of the groups based on the identifying information acquired from the position of the cursor.

Also in the case in which e certain group including objects is perfectly hidden under the other group in respect of a display, accordingly, it is possible to select a desirable group including the hidden group by a very simple operation for only moving the cursor. Also in the case in which a certain object is perfectly hidden under the other object in respect of the display, moreover, it is possible to select a desirable object including the hidden object by a very simple operation for only carrying out a determined click operation (for example, a left click).

Although the description has been given to the example in which the color information is acquired from the first identifying layout information or the second identifying layout information depending on a distinction as to whether the mouse cursor is simply placed over a desirable position or is clicked in the application example, the present invention is not restricted thereto. For instance, referring, to the identifying information for identifying the group, any color information is not given to a part of the rectangular region representing the position of the group in the first identifying layout information in which objects are positioned, and the color information is given to only the residual region in the rectangular region. The color information may be acquired from the second identifying layout information in the case in which a part of the rectangular region representing the group including the objects where the objects are positioned is designated by the mouse cursor, and the color information may be acquired from the first identifying layout information in the case in which the residual region in the rectangular region is designated by the mouse cursor.

In this case, a starting operation of an application related to the object or the like may be carried out when a part of the rectangular region representing the group in which objects are positioned is designated by the mouse cursor, while the group may be highlighted when the residual region in the rectangular region is designated by the mouse cursor. By varying the position of the mouse cursor, consequently, the content of the operation to be controlled by the operation control portion 17' can be made different.

Although the description has been given on the assumption that the chart image 84 such as a graph is not an object which can be selected by the mouse cursor in the application example, moreover, this can also be treated as the object. For example, a single graph represented by the chart image 84 may be set to be a single group and a plurality of breakpoints on the graph may be set to be respective objects in the group. In this case, a similar color which is different in an identical color group is given to each dot on the graph, thereby generating the first identifying layout information, and the same color information as the color information given to the breakpoint portion in the first identifying layout information is given to a dot corresponding to the breakpoint, thereby generating the second identifying layout information.

In this case, for example, it is possible to highlight a graph when designating the graph other than the breakpoint by the mouse cursor, and to label information about the breakpoint portion when the breakpoint portion is designated by the mouse cursor. Necessary information for the labeling is indicated by original data. By storing the necessary information for the labeling in relation to the second identifying layout information, it is possible to acquire corresponding label information together when acquiring the color information corresponding to the position of the mouse cursor from the second identifying layout information.

Although the description has been given to the example in which the color information is used as the identifying information constituting the identifying layout information in the embodiment, moreover, the present invention is not restricted thereto. In other words, it is also possible to use any information capable of identifying a plurality of objects included in an image (objects and groups in the application example) respectively other than the color information.

Although the description has been given to the example in which the dot on the image displayed on the display device 300 is designated by the cursor of the mouse 400 in the embodiment, moreover, the present invention is not restricted thereto. For example, a touch panel may be provided on the display device 300 to designate the dot on the image by means of a touch on the touch panel with a touch pen or a finger.

Although the description has been given to the example in which the identifying layout information is generated based on the image including the objects in the embodiment, moreover, the present invention is not restricted thereto. For example, in the case in which the layout of the object included in the image is apparent from the original data, the identifying layout information may be generated based on the original data.

In addition, the embodiment is only illustrative as a materialization for carrying out the present invention and the technical scope of the present invention should not be thereby construed to be restrictive. In other words, the present invention can be carried out in various forms without departing from the spirit or main feature thereof.

Industrial Applicability

An object processing device and an object selection method according to the present invention can be utilized in a computer system having a function for selecting a desirable one of objects displayed on a screen by means of a pointing device.

The invention claimed is:

1. An object processing device comprising: an identifying information generating portion for generating identifying information capable of identifying a plurality of objects respectively and generating identifying layout information constituted by giving the identifying information to dots related to the objects respectively over the same two-dimensional layout as the image in relation to an image including the objects;

an identifying information acquiring portion for acquiring identifying information corresponding to any of the dots which is designated over an image displayed on a display device from the identifying layout information; and an object selecting portion for selecting any of the objects which corresponds to the identifying information acquired by the identifying information acquiring portion, wherein the identifying information generating portion decides whether the objects overlap with each other or not and gives the identifying information of the objects to the dots which correspond to the objects having no overlap respectively, and gives the identifying information of the objects to the dots which correspond to a portion having no overlap in relation to the objects having the overlap, and divides the overlapping portion into a plurality of small regions to give the identifying information of the objects to the dots corresponding to the small regions respectively, thereby generating the identifying layout information, wherein the identifying information generating portion classifies a plurality of objects included in the image into a plurality of groups, and generates first identifying layout information constituted by giving identifying information capable of identifying the groups to dots corresponding to a predetermined region surrounding all of the objects included in the groups respectively over the same two-dimensional layout as the image with respect to the respective groups, and second identifying layout information constituted by giving identifying information capable of identifying the individual objects to the dots corresponding to the individual objects included in the group respectively over the same two-dimensional layout as the image with respect to the respective objects included in the group, and the object selecting portion selects a group including an object corresponding to the identifying information acquired from the first identifying layout information through the identifying information acquiring portion and selects an object corresponding to the identifying information acquired from the second identifying layout information through the identifying information acquiring portion.

2. The object processing device according to claim 1, wherein the identifying information of each of the dots which is generated by the identifying information generating portion is color information.

3. The object processing device according to claim 1, wherein the identifying information about the dots which is generated by the identifying information generating portion is color information in which a similar color within a predetermined range is grouped into an identical color group, the identifying information generating portion gives the color information about the similar color belonging to the identical color group to the dots corresponding to a single group and each of objects included therein respectively and gives color information about a similar color which is different from the first identifying layout information to the dots corresponding to the objects which are included in the single group in that case respectively, thereby generating the second identifying layout information.

4. An object selection method comprising:
- an identifying information generating step of generating identifying information capable of identifying a plurality of objects respectively and generating identifying layout information constituted by giving the identifying information to dots related to the objects respectively over the same two-dimensional layout as the image in relation to an image including the objects;
- an identifying information acquiring step of acquiring identifying information corresponding to any of the dots which is designated over an image displayed on a display device from the identifying layout information; and
- an object selecting step of selecting any of the objects which corresponds to the identifying information acquired at the identifying information acquiring step,
- wherein at the identifying information generating step, it is decided whether the objects overlap with each other or not and the identifying information of the object is given to the dots which correspond to the object having no overlap respectively, and the identifying information of the objects is given to the dots which correspond to a portion having no overlap in the objects having the overlap respectively, and the overlapping portion is divided into a plurality of small regions to give the identifying information of the objects to the dots corresponding to the small regions respectively, thereby generating the identifying layout information,
- wherein the identifying information generating portion classifies a plurality of objects included in the image into a plurality of groups, and generates first identifying layout information constituted by giving identifying information capable of identifying the groups to dots corresponding to a predetermined region surrounding all of the objects included in the groups respectively over the same two-dimensional layout as the image with respect to the respective groups, and second identifying layout information constituted by giving identifying information capable of identifying the individual objects to the dots corresponding to the individual objects included in the group respectively over the same two-dimensional layout as the image with respect to the respective objects included in the group, and
- the object selecting portion selects a group including an object corresponding to the identifying information acquired from the first identifying layout information through the identifying information acquiring portion and selects an object corresponding to the identifying information acquired from the second identifying layout information through the identifying information acquiring portion.

* * * * *